(12) United States Patent
Matsuzawa et al.

(10) Patent No.: US 6,199,582 B1
(45) Date of Patent: Mar. 13, 2001

(54) FLOW CONTROL VALVE

(75) Inventors: Hironori Matsuzawa; Tsuyoshi Hida; Kimihito Sasao, all of Nagoya (JP)

(73) Assignee: Advance Denki Kougyou Kabushiki, Aichi-Ken (JP)

( * ) Notice: Subject to any disclaimer, the term of this patent is extended or adjusted under 35 U.S.C. 154(b) by 0 days.

(21) Appl. No.: 09/341,121

(22) Filed: Jul. 8, 1999

(30) Foreign Application Priority Data

Dec. 25, 1998 (JP) .................................................. 10-370486

(51) Int. Cl.[7] ...................................................... G05D 7/00
(52) U.S. Cl. ............................ 137/503; 137/495; 137/510
(58) Field of Search .................... 137/503, 495, 137/510

(56) References Cited

U.S. PATENT DOCUMENTS

| 1,743,127 | * | 1/1930 | Fuller . | |
|---|---|---|---|---|
| 2,160,849 | | 6/1939 | Fausek, et al. . | |
| 2,220,496 | * | 11/1940 | Ringelstetter | 137/503 X |

FOREIGN PATENT DOCUMENTS

| 550466 | * | 12/1957 | (CA) | 134/503 |
|---|---|---|---|---|
| 0 783 145 A1 | | 7/1997 | (EP) . | |

OTHER PUBLICATIONS

Patent Abstract of Japan: "Differential Pressure Driven Three Way Type Valve ", Inventor: Irisa Hirokazu, Mar. 19, 1986.

* cited by examiner

Primary Examiner—Stephen M. Hepperle
(74) Attorney, Agent, or Firm—Arent Fox Kintner Plotkin & Kahn, PLLC (57) ABSTRACT

The flow control valve (10) has a body (11) and a valve mechanism (40). The body defines a chamber (20). The chamber involves an inlet (12) for receiving fluid to control, a valve seat (16) for passing the fluid, and an outlet (15) for discharging the fluid. The valve mechanism consists of a valve plug (41) for opening and closing the valve seat, a first diaphragm (50) arranged in the vicinity of the inlet, and a second diaphragm (60) arranged in the vicinity of the outlet. Each of the diaphragms is in the chamber and has a periphery fixed to the body. The diaphragms divide the chamber into a first pressure chamber (21) outside the first diaphragm, a valve chamber (25) between the diaphragms, and a second pressure chamber (30) outside the second diaphragm. The valve chamber includes the inlet, valve seat, and outlet. The first and second pressure chambers have a first pressurizing unit (M1) and second pressurizing unit (M2), respectively, to always apply constant pressure to the valve chamber through the first and second diaphragms. The first diaphragm (50) is provided with an integrated first member (51) having the valve plug (41), and the second diaphragm (60) is provided with an integrated second member (61) that removably engages with the first member.

9 Claims, 11 Drawing Sheets

Embodiment
(with throttle mechanism)

(5B)

Comparison
(without throttle mechanism)

Relationships between pressure set by pressurerizing unit and flow rate

FLOW CONTROL VALVE

BACKGROUND OF THE INVENTION

1. Field of the Invention

The present invention relates to a flow control valve for maintaining a constant flow rate of fluid (liquid or gas).

2. Description of the Related Art

The inventors of the present invention have disclosed, in Japanese Patent No. 2671183, a flow control valve employing diaphragms to secure a constant flow rate at the discharge (secondary) side of the valve irrespective of pressure variations at the inlet (primary) side thereof.

Figure 10:
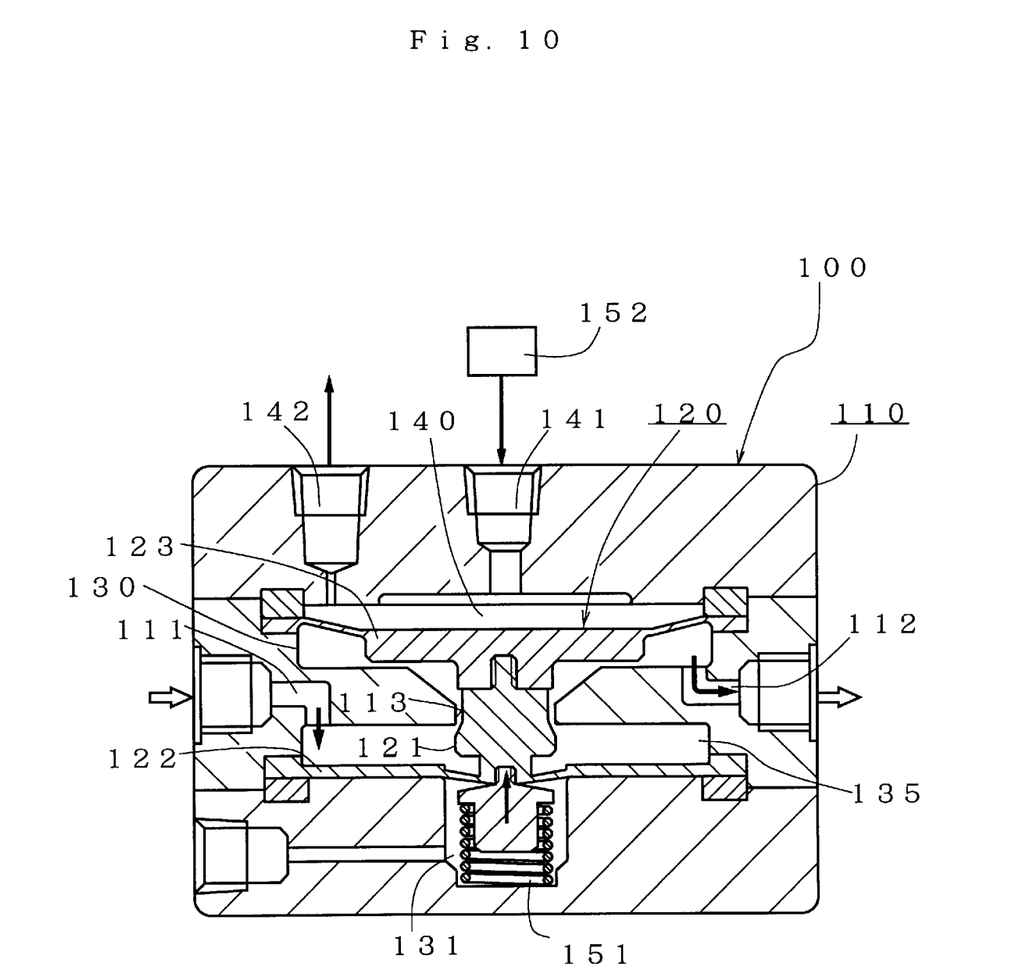
FIG. 10 is a longitudinal section showing a controlling state of a flow control valve according to the prior art.
Figure 11:
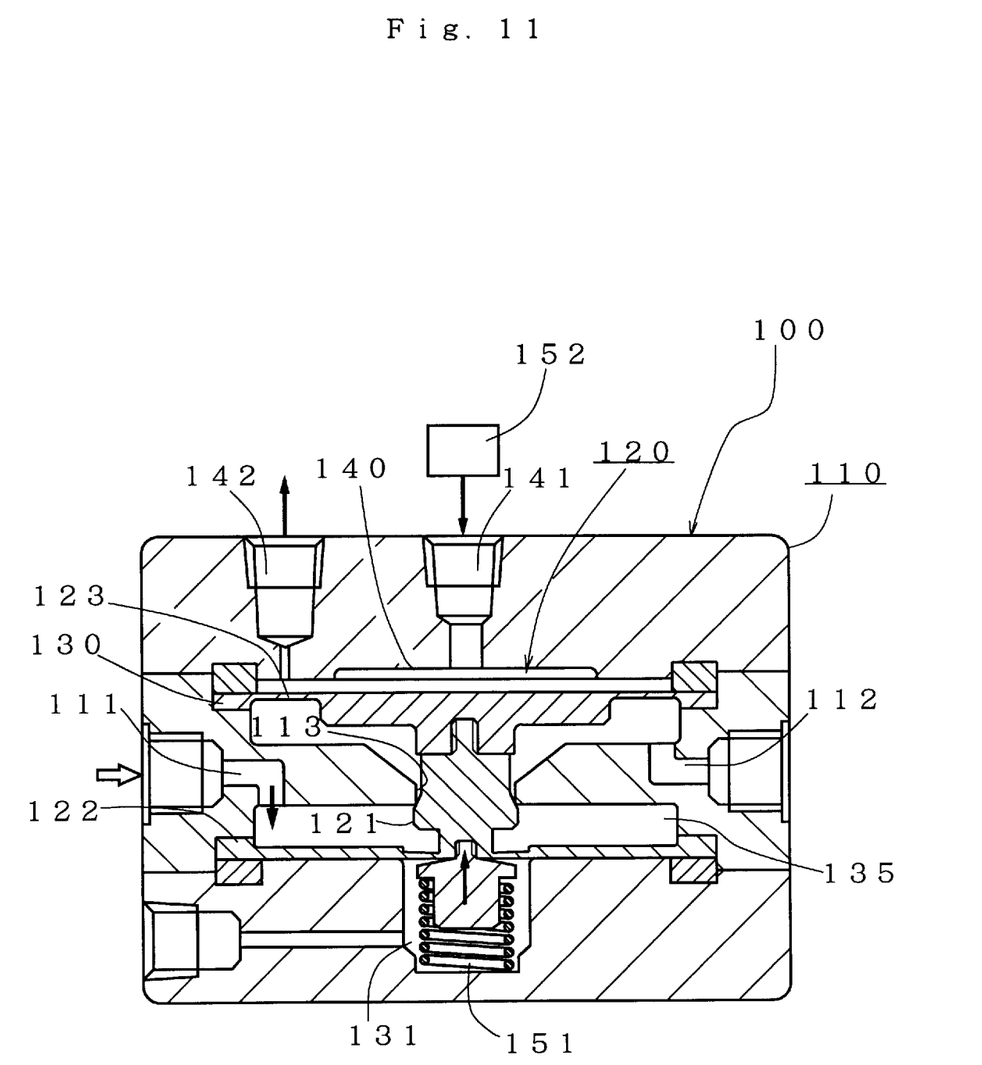
FIG. 11 is a longitudinal section showing a closed state of the valve of FIG. 10.

FIGS. 10 and 11 show this disclosure. The flow control valve 100 has a body 110 and a valve mechanism 120. The body 110 defines a chamber 130, which has an inlet 111 for receiving fluid to control, a valve seat 113 for passing the fluid, and an outlet 112 for discharging the fluid. The valve mechanism 120 has a valve plug 121 for opening and closing the valve seat 113, a first diaphragm 122 arranged on the inlet side, and a second diaphragm 123 arranged on the outlet side. The first and second diaphragms 122 and 123 divide the chamber 130 into a first pressure chamber 131, a valve chamber 135, and a second pressure chamber 140. A first pressurizing unit 151 is arranged in the first pressure chamber 131 and a second pressurizing unit 152 is arranged in the second pressure chamber 140, to inwardly (toward the valve chamber 135) apply constant pressure to the first and second diaphragms 122 and 123. In this example, the first pressurizing unit 151 is a spring and the second pressurizing unit 152 is pressurized gas. The valve 100 also has an intake port 141 for receiving the pressurized gas and a discharge port 142 for discharging the same.

In the valve 100, a pressure change at the inlet 111 works as a back pressure (outward pressure) on the first and second diaphragms 122 and 123. The valve mechanism 120 moves to balance the back pressure with the inward pressure applied by the pressurizing units 151 and 152. This results in moving the valve plug 121 to change an aperture between the valve plug 121 and the valve seat 113, thereby controlling the flow rate of the fluid controlled by the valve 100.

The valve mechanism 120 with the integrated diaphragms 122 and 123 provides a great advantage of quickly responding to instantaneous or pulsating pressure changes in the fluid controlled by the valve 100. This kind of pressure changes cannot be coped with by conventional valves having mechanical or electrical means. Further advantages of the valve 100 are the simple mechanism and structure and easy maintenance of the valve.

The valve 100, however, has presented new problems due to the integrated first and second diaphragms 122 and 123.

When the outlet 112 is clogged or closed, the second diaphragm 123 receives a large back pressure to apply large load on the valve mechanism 120. This large load may damage a joint (fastened with threaded parts) between the first and second diaphragms 122 and 123. When the back pressure at the outlet 112 moves the valve plug 121 to close the valve seat 113, large friction occurs between them due to the back pressure acting on the second diaphragm 123 and the pressure applied by the first pressuring unit 151 on the first diaphragm 122. This may break the valve plug 121 and valve seat 113 to produce dust particles.

These problems may lead to a failure of the valve 100 and deteriorate the function, durability, and reliability thereof. The dust particles, if produced, are hazardous to ultrapure water or chemical fluid for which such flow control valves are widely used.

SUMMARY OF THE INVENTION

An object of the present invention is to provide a flow control valve having a novel structure to prevent the deterioration and damage of the valve or the production of dust particles in the valve even if an outlet (secondary side) of the valve shows a load increase.

Another object of the present invention is to provide a flow control valve capable of closing the secondary side thereof, to develop new application fields for the valve.

Still another object of the present invention is to provide a flow control valve having simple and inexpensive mechanical and electrical structures including a diaphragm mechanism to instantaneously respond to momentary or pulsating load changes.

In order to accomplish the objects, a first aspect of the present invention provides a flow control valve (10) having a body (11) and a valve mechanism (40). The body defines a chamber (20). The chamber involves an inlet (12) for receiving fluid to control, a valve seat (16) for passing the fluid, and an outlet (15) for discharging the fluid. The valve mechanism consists of a valve plug (41) for opening and closing the valve seat, a first diaphragm (50) arranged in the vicinity of the inlet, and a second diaphragm (60) arranged in the vicinity of the outlet. Each of the diaphragms is in the chamber and has a periphery fixed to the body. The diaphragms divide the chamber into a first pressure chamber (21) outside the first diaphragm, a valve chamber (25) between the diaphragms, and a second pressure chamber (30) outside the second diaphragm. The valve chamber includes the inlet, valve seat, and outlet. The first and second pressure chambers have a first pressurizing unit (M1) and second pressurizing unit (M2), respectively, to always apply constant pressure to the valve chamber through the first and second diaphragms. The first diaphragm (50) is provided with an integrated first member (51) having the valve plug (41), and the second diaphragm (60) is provided with an integrated second member (61) that removably engages with the first member.

A second aspect of the present invention provides the first and second members with a conical projection (52) and a conical recess (62), respectively, so that the projection and recess may removably engage with each other.

A third aspect of the present invention forms the pressurizing unit provided for the first pressure chamber with a spring (S1).

A fourth aspect of the present invention forms the pressurizing unit provided for the second pressure chamber with pressurized gas (A1).

A fifth aspect of the present invention arranges a check valve (35) at an intake port (31) that introduces the pressurized gas into the second pressure chamber.

A sixth aspect of the present invention arranges a throttle mechanism (37) in a supply circuit (36) that supplies the pressurized gas to the second pressure chamber.

A seventh aspect of the present invention arranges a throttle mechanism (39) in a discharge circuit (38) that discharges the pressurized gas from the second pressure chamber.

An eighth aspect of the present invention provides the second diaphragm with a suck-back mechanism (70).

A ninth aspect of the present invention forms the suck-back mechanism with a spring (S2) that pushes the second diaphragm away from the valve chamber.

DESCRIPTION OF THE PREFERRED EMBODIMENTS

Preferred embodiments of the present invention will be explained with reference to the drawings.

Figure 1:
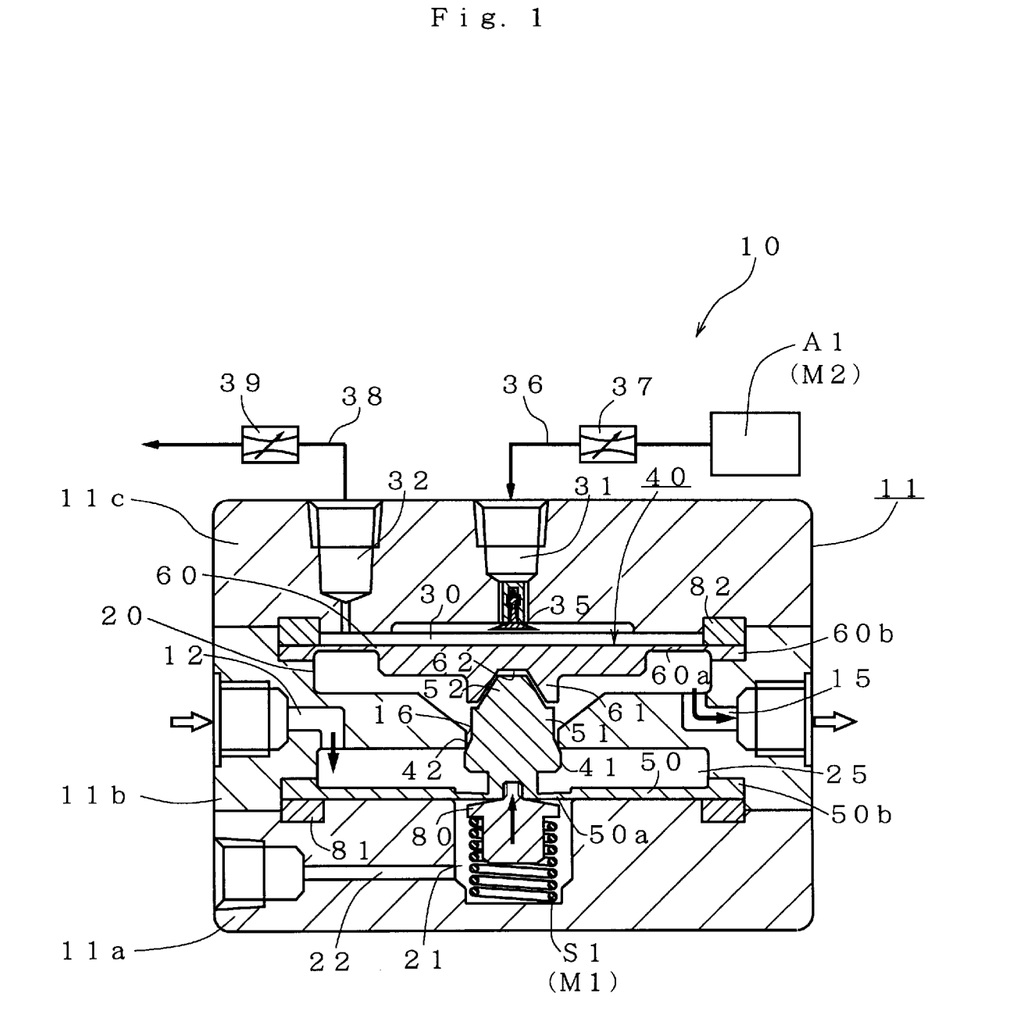
FIG. 1 is a longitudinal section showing a flow control valve according to an embodiment of the present invention.

FIG. 1 is a longitudinal section showing a flow control valve 10 according to an embodiment of the present invention. The valve 10 has a body 11, a chamber 20 formed in the body 11, and a valve mechanism 40 arranged in the chamber 20.

Figure 2:
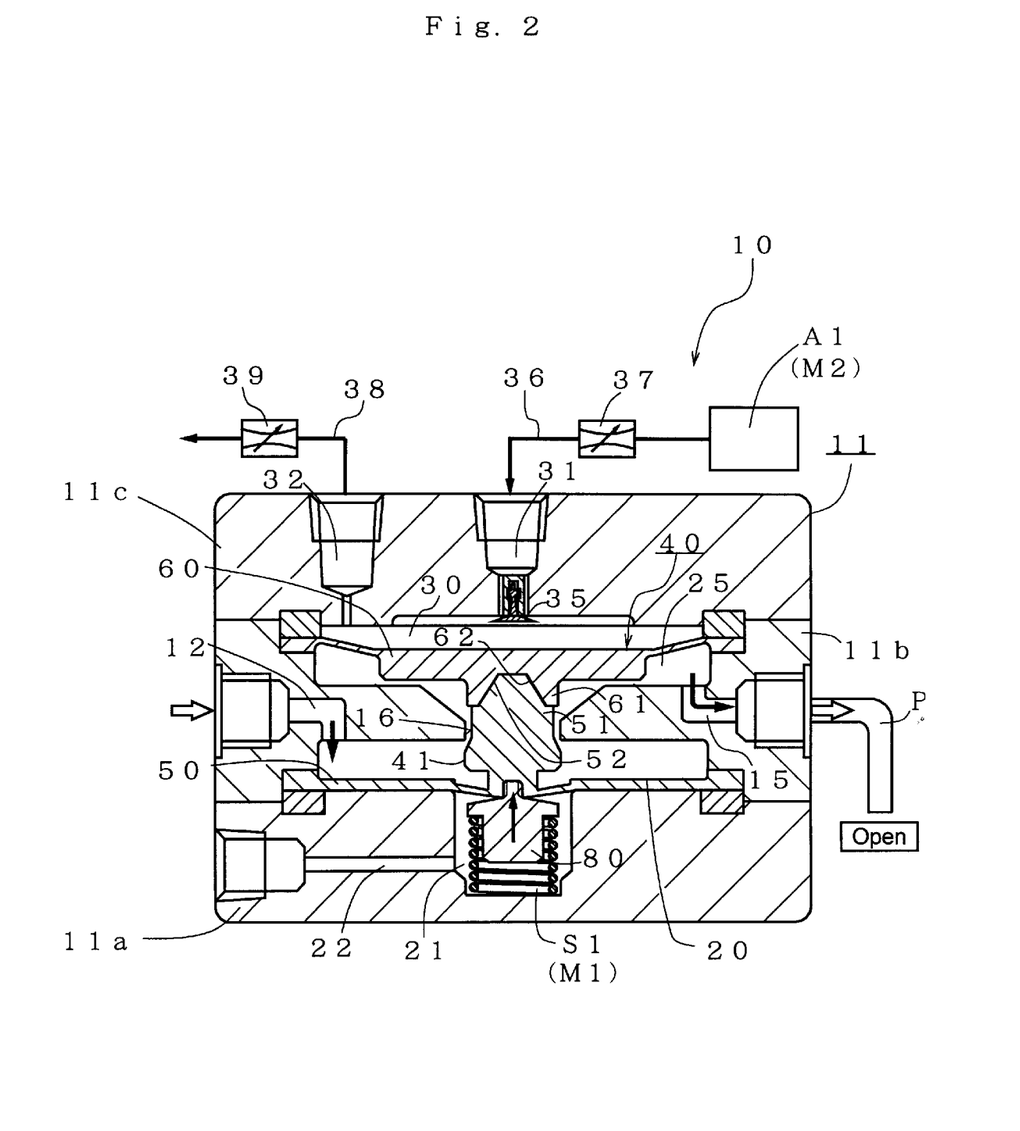
FIG. 2 is a longitudinal section showing a flow controlling state of the valve of FIG. 1.
Figure 3:
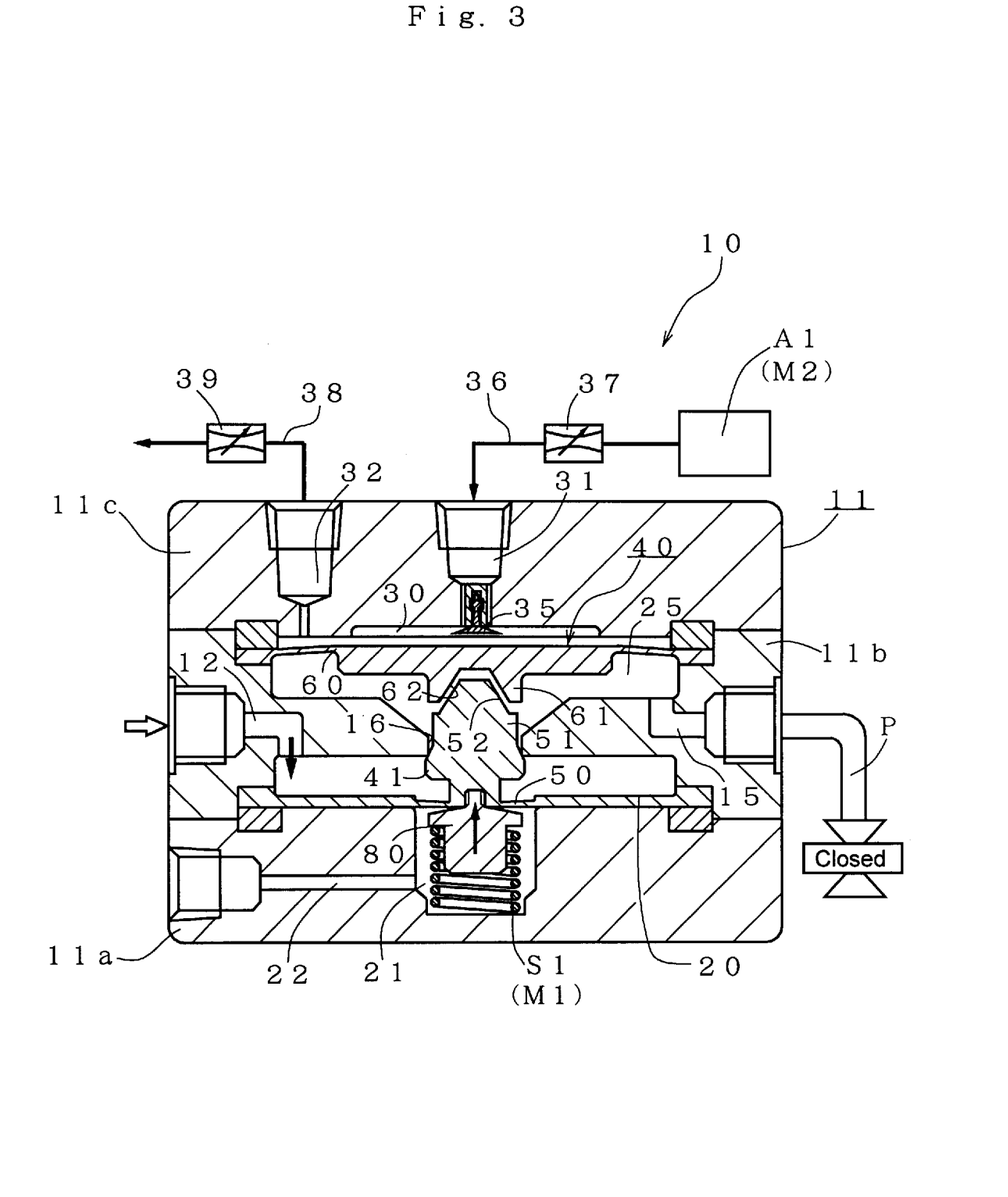
FIG. 3 is a longitudinal section showing a closed state of the valve of FIG. 1.

The body 11 is made of resin such as fluorine resin having high resistance against corrosion and chemicals. The chamber 20 has an inlet 12 for receiving fluid to control, a valve seat 16 for passing the fluid, and an outlet 15 for discharging the fluid. The body 11 is divided into a first block 11a, a second block 11b, and a third block 11c, which are assembled into one body. The outlet 15 may have an orifice (not shown) having a proper diameter. The inlet 12 is connected to an inlet pipe (not shown) and the outlet 15 is connected to an outlet pipe P (FIGS. 2 and 3).

The valve mechanism 40 is made of resin such as fluorine resin having high resistance against corrosion and chemicals. The valve mechanism 40 consists of a valve plug 41, a first diaphragm 50, and a second diaphragm 60.

Each part of the valve mechanism 40 will be explained.

The valve plug 41 opens and closes the valve seat 16 and controls an aperture formed between them, thereby controlling the flow rate of fluid passing through the aperture. The valve plug 41 has a tapered face 42 to linearly control the aperture.

The first diaphragm 50 is integrated with the valve plug 41 and consists of a thin movable part 50a serving as a diaphragm plane and a periphery 50b. The second diaphragm 60 has a thin movable part 60a serving as a diaphragm plane and a periphery 60b. The areas (effective diaphragm areas) of the movable parts 50a and 60a are set to provide good controllability so that the diaphragms 50 and 60 may instantaneously respond to momentary or pulsating load changes in the fluid.

The first diaphragm 50 has an integrated first member 51 having the valve plug 41. The second diaphragm 60 has an integrated second member 61 that removably engages with the first member 51.

According to the second aspect of the present invention, the first member 51 has a conical projection 52, which removably engages with a conical recess 62 formed on the second member 61. Conversely, the conical recess may be formed on the first member 51 and the conical projection on the second member 61. These recess and projection secure the positioning of the first and second members 51 and 61 when they engage with each other.

The first and second members 51 and 61 may be formed integrally with the first and second diaphragms 50 and 60, or separately from the diaphragms and fixed thereto with proper means such as with appropriate threaded portions.

A spring receiver 80 receives a spring S1 serving as a first pressurizing unit M1. The spring receiver 80 is attached to the first diaphragm 50 by appropriate means such as screwing or fastening. If no spring is used, the spring receiver 80 is omitted.

The diaphragms 50 and 60 are installed in the chamber 20 by fixing the peripheries 50b and 60b thereof to the body 11. In the example, the periphery 50b of the first diaphragm 50 is firmly held between the first and second blocks 11a and 11b of the body 11, and the periphery 60b of the second diaphragm 60 is firmly held between the second and third blocks 11b and 11c of the body 11. A seal 81 seals a gap between the body 11 and the first diaphragm 50, and a seal 82 seals a gap between the body 11 and the second diaphragm 60.

The first and second diaphragms 50 and 60 divide the chamber 20 into a first pressure chamber 21, a valve chamber 25, and a second pressure chamber 30.

Each of these chambers will be explained.

The first pressure chamber 21 is outside (below in the figures) the first diaphragm 50 and has the first pressurizing unit M1 for always applying a first set pressure to the first diaphragm 50. The first set pressure is oriented toward the valve chamber 25. Namely, the first set pressure is inwardly (upwardly in the figures) oriented.

According to the third aspect of the present invention, the first pressurizing unit M1 is a spring S1 having a predetermined spring constant. The spring S1 is arranged between the bottom of the first pressure chamber 21 and the spring receiver 80 formed on the first diaphragm 50. The spring S1 simplifies the structure of the pressurizing unit M1 and reduces the cost thereof. The pressurizing unit M1 is not limited to a spring. It may be pressurized gas, a combination of a spring and pressurized gas, a solenoid, or any other suitable means.

When the spring is used alone, a spring presser and a screw (both not shown) are used to freely adjust the force of the spring. This arrangement may be combined with a device such as a servomotor to automatically control the spring constant.

The first pressure chamber 21 has a vent 22 for passing air.

The valve chamber 25 is between the first and second diaphragms 50 and 60 and has the inlet 12, valve seat 16, and outlet 15. The valve seat 16 is a corner of the second block 11b of the body 11. The aperture between the valve plug 41 and the valve seat 16 changes as the valve plug 41 moves, thereby controlling the flow rate of the fluid flowing from the inlet 12 to the outlet 15.

The second pressure chamber 30 is outside (above in the figures) the second diaphragm 60 and has a second pressurizing unit M2 for always applying a second set pressure to the second diaphragm 60. The second set pressure is oriented toward the valve chamber 25. Namely, the second set pressure is inwardly (downwardly in the figures) oriented. According to the fourth aspect of the present invention, the second pressurizing unit M2 is a pressurized gas A1.

The pressurized gas A1 is easy to adjust and effective to provide a large pressure.

The second pressure chamber 30 has an intake port 31 for introducing the pressurized gas A1 into the chamber 30 and a discharge port 32 for discharging the same from the chamber 30. In the figures, a pressurizing unit for producing the pressurized gas A1 is omitted. The second pressurizing unit M2 may be a spring device whose force is freely adjustable, a solenoid, or any other suitable means.

The operation of the flow control valve 10 will be explained with reference to FIGS. 2 and 3.

The pressurizing units M1 and M2 always inwardly apply the first and second set pressures to the first and second diaphragms 50 and 60. Under a normal control state, the first and second set pressures are balanced with a predetermined flow rate of fluid flowing through the valve mechanism 40, as shown in FIG. 2. Namely, the aperture between the valve plug 41 and the valve seat 16 is kept constant, and the fluid enters the inlet 12 on the primary side, flows through the valve chamber 25, and is discharged from the outlet 15 on the secondary side at the predetermined flow rate.

If any change occurs in the fluid at the inlet 12, the change causes a pressure change. The pressure change works as back pressure to generate outward force. The back pressure moves the valve mechanism 40 so that the back pressure is balanced with the inward pressures applied by the pressurizing units M1 and M2. Namely, the valve plug 41 moves to change the aperture between the valve plug 41 and the valve seat 16, thereby controlling the flow rate of the fluid passing through the aperture. Since the back pressure is balanced with the inward pressures applied by the pressurizing units M1 and M2, the first and second members 51 and 61 of the valve mechanism 40 are kept engaged with each other.

If the outlet pipe P is closed as shown in FIG. 3, a pressure increase occurs at the outlet 15 to produce a back pressure. The back pressure outwardly acts on the first and second diaphragms 50 and 60, in particular, the second diaphragm 60 and is usually larger than the back pressure in the normal state of FIG. 2. As a result, the second diaphragm 60 moves outwardly (upwardly in the figure). Due to this, the first diaphragm 50 moves toward the second diaphragm 60 so that the valve plug 41 closes the valve seat 16. At this time, the force that moves the first diaphragm 50 and valve plug 41 toward the inside of valve chamber 25 is only the pressure produced by the first pressurizing unit M1.

If the back pressure further acts on the second diaphragm 60 after the valve seat 16 is closed with the valve plug 41, the first member 51 on the first diaphragm 50 separates from the second member 61 of the second diaphragm 60 as shown in FIG. 3.

This means that the large pressure acting on the second diaphragm 60 does not adversely affect the valve mechanism 40. When the first and second members 51 and 61 are separated from each other, the valve mechanism 40 is divided into the first and second diaphragms 50 and 60, so that the valve plug 41 closes the valve seat 16 only with the pressure by the first pressurizing unit M1, while the diaphragm plane 60a of the second diaphragm 60 absorbs the excessive back pressure.

In this way, the present invention does not apply an excessive load on the valve mechanism 40, and therefore, no breakage or the production of dust particles occurs between the valve plug 41 and the valve seat 16.

In addition, the present invention allows the secondary side to be closed without problems as shown in FIG. 3. Namely, the flow control valve of the present invention opens a new aspect of use of not only controlling a flow rate of fluid but also starting and stopping a flow of fluid. For example, the valve allows the outlet pipe P to be closed in response to a signal from a cumulative flow meter. This sort of control is unachievable by conventional flow control valves. The valve also allows the secondary side to be closed by stopping the second pressurizing unit M2 working on the second pressure chamber 30.

Variations of the present invention will be explained.

Figure 4:
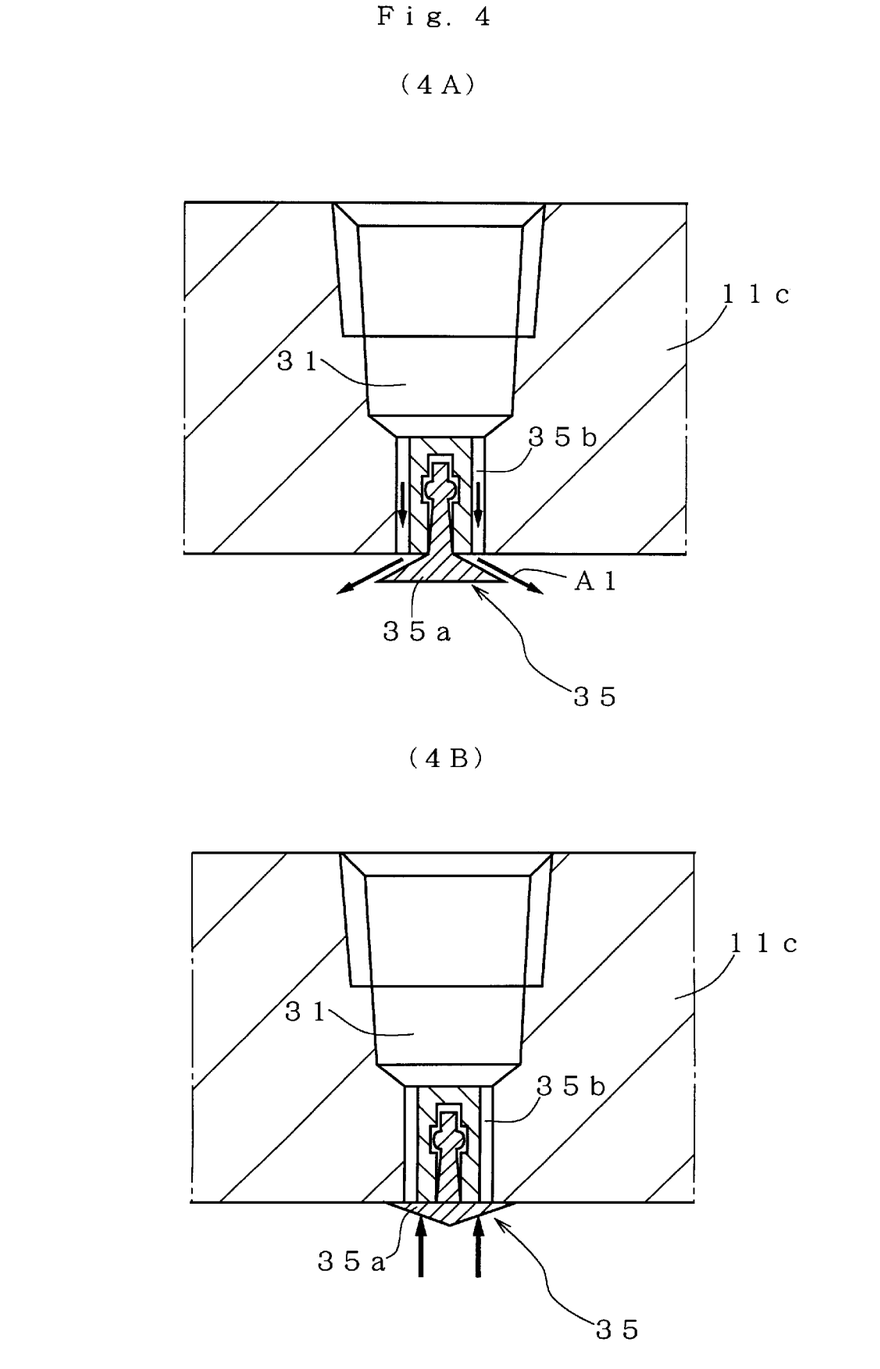
FIGS. 4A and 4B are enlarged partial sections showing an intake port for introducing pressurized gas into a second pressure chamber of the valve of FIG. 1.

According to the fifth aspect of the present invention, the intake port 31 for introducing the pressurized gas A1 into the second pressure chamber 30 is provided with a check valve 35 having a plug 35a made of resilient material such as rubber, as shown in FIG. 4A.

Even if the second diaphragm 60 is broken, the check valve 35 prevents the fluid controlled by the valve 10 from entering into the intake port 31. This prevents damage on a control device such as a solenoid valve and a pressure adjuster operating for the intake port 31. In FIG. 4A, the check valve 35 is in a normal state with the plug 35a being opened by the pressurized gas so that the pressurized gas may flow through a path 35b of the check valve 35. FIG. 4B shows an abnormal state that the second diaphragm 60 is broken to leak the fluid controlled by the valve 10 into the second pressure chamber 30. The pressure of the fluid resiliently deforms the plug 35a to close the path 36b.

According to the sixth aspect of the present invention, a throttle mechanism 37 such as a throttle valve is arranged at a predetermined position in an intake circuit 36 (including the intake port 31) that guides the pressurized gas A1 into the second pressure chamber 30. The throttle mechanism 37 is capable of gradually changing the second set pressure applied by the second pressurizing unit M2, as indicated with a continuous line in FIG. 5A. As a result, the pressure and flow rate of the fluid controlled by the valve 10 gradually change as indicated with a dotted line in FIG. 5A. This prevents a water hammer phenomenon to occur in the fluid.

Figure 5:
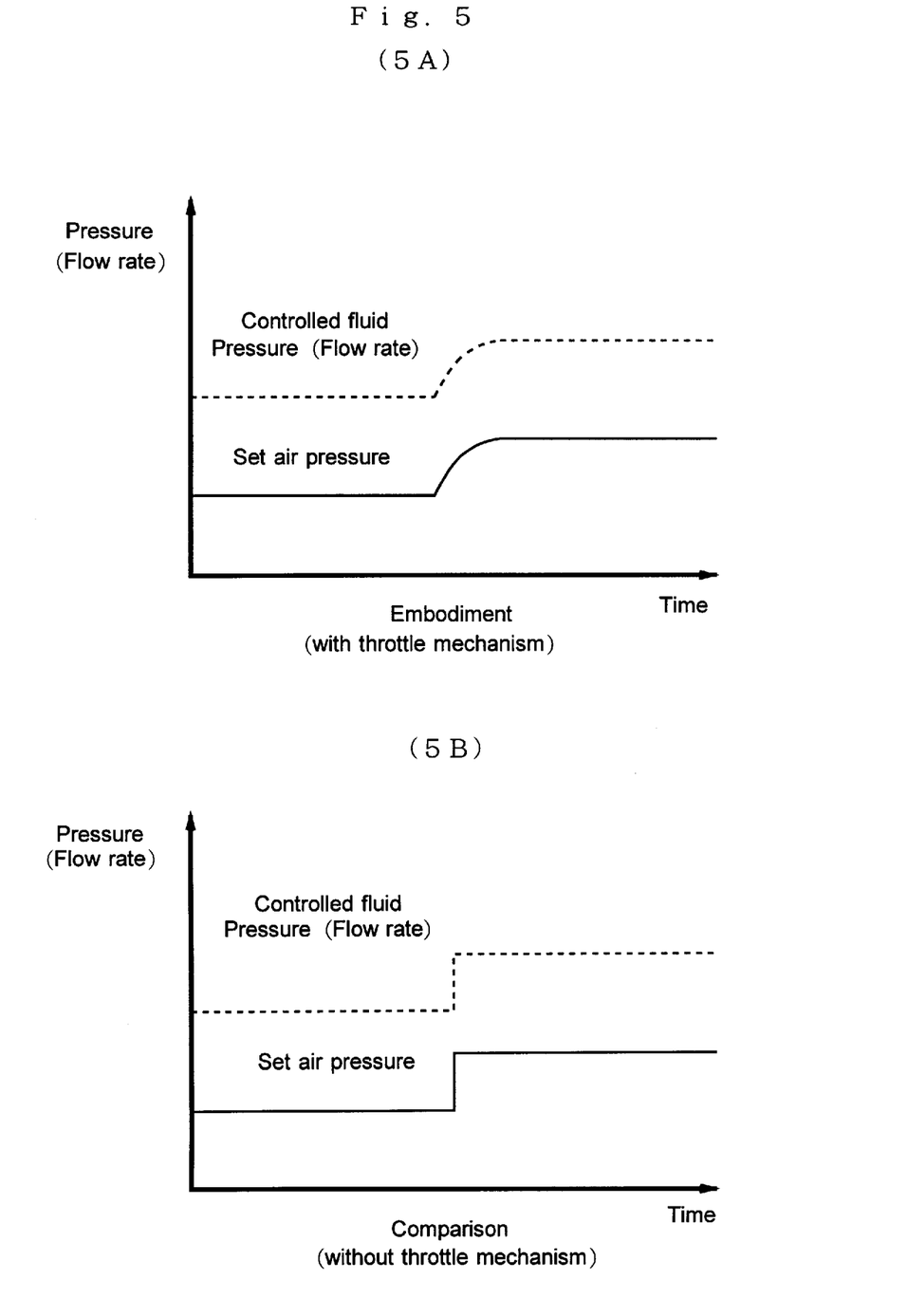
FIG. 5A is graph showing relationships between the set pressure of a pressurizing unit of the valve of FIG. 1 and changes in the pressure and flow rate of fluid controlled by the valve.
FIG. 5B is a graph showing a comparison example for the graph of FIG. 5A.

If there is no throttle mechanism 37, the second set pressure applied by the second pressurizing unit M2 suddenly changes as indicated with a continuous line in FIG. 5B, and therefore, the flow rate of the fluid controlled by the valve also suddenly changes as indicated with a dotted line in FIG. 5B. This may cause the water hammer phenomenon.

Figure 6:
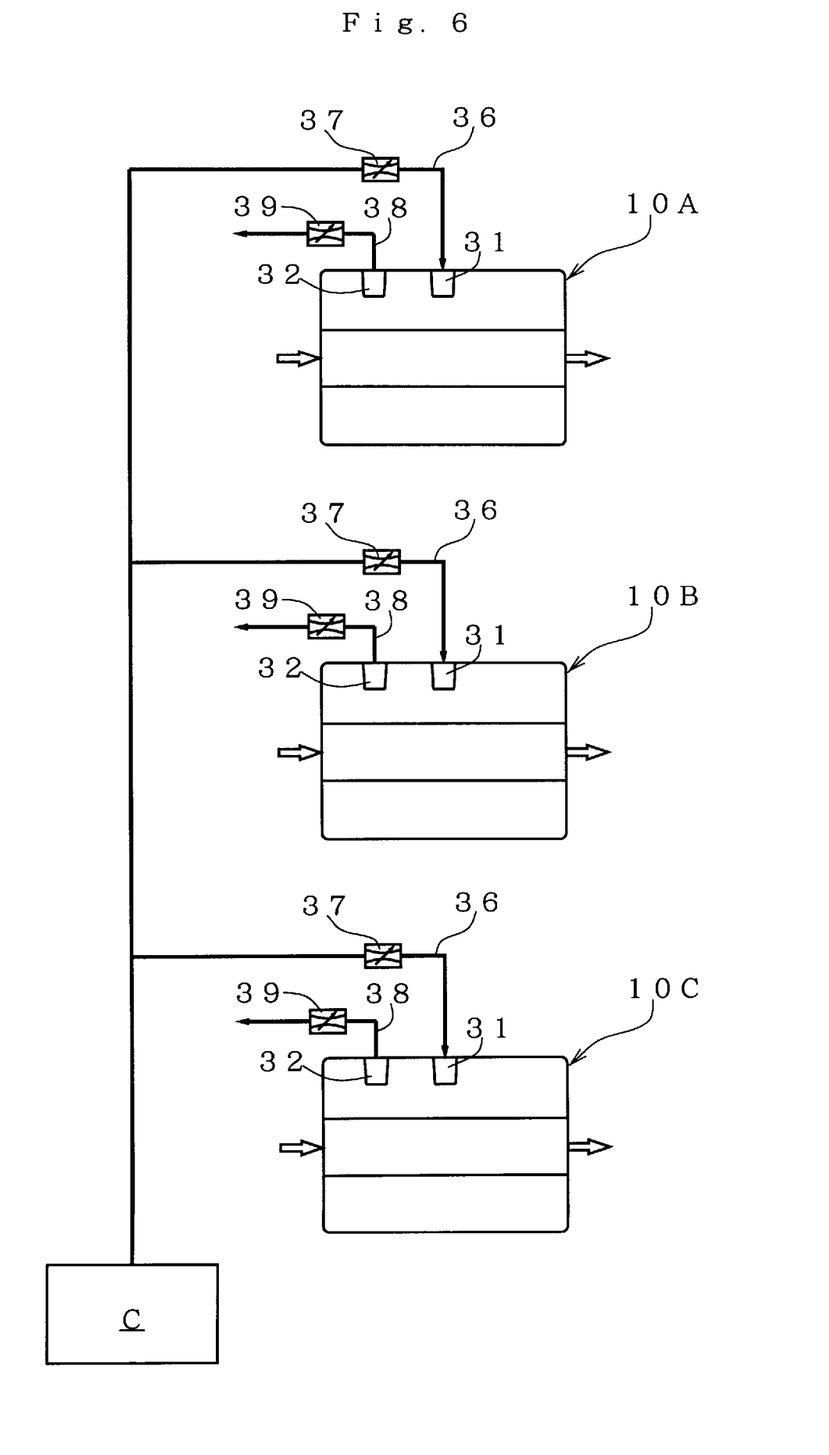
FIG. 6 shows an arrangement of flow control valves according to the present invention.

According to the seventh aspect of the present invention, a throttle mechanism 39 is arranged at a predetermined position in a discharge circuit 38 (including the discharge port 32) that discharges the pressurized gas A1 from the second pressure chamber 30.

The throttle mechanism 39 controls a discharge rate of the pressurized gas A1. In FIG. 6, flow control valves 10A, 10B, and 10C each being identical to the valve 10 of FIG. 1 are arranged to supply controlled fluid from a single source to respective objects. The valves 10A to 10C commonly receive pressurized gas A1 to apply the same second set pressure to the second pressure chambers 30 thereof. Even if the valves 10A to 10C involve individual differences, the flow rate and pressure of the controlled fluid in each valve are set to target values by adjusting the throttle mechanisms 39 without individually adjusting the pressurized gas supplied to the intake ports 31 of the valves 10A to 10C. A single pressure adjuster C is sufficient for the intake circuits 36 of the valves 10A to 10C to equalize the flow rates and pressures of the controlled fluid in the valves 10A to 10C. The throttle mechanism 39 achieves an additional advantage that the flow rate of the fluid controlled by each valve is adjustable by manipulating the throttle mechanism 39.

Figure 7:
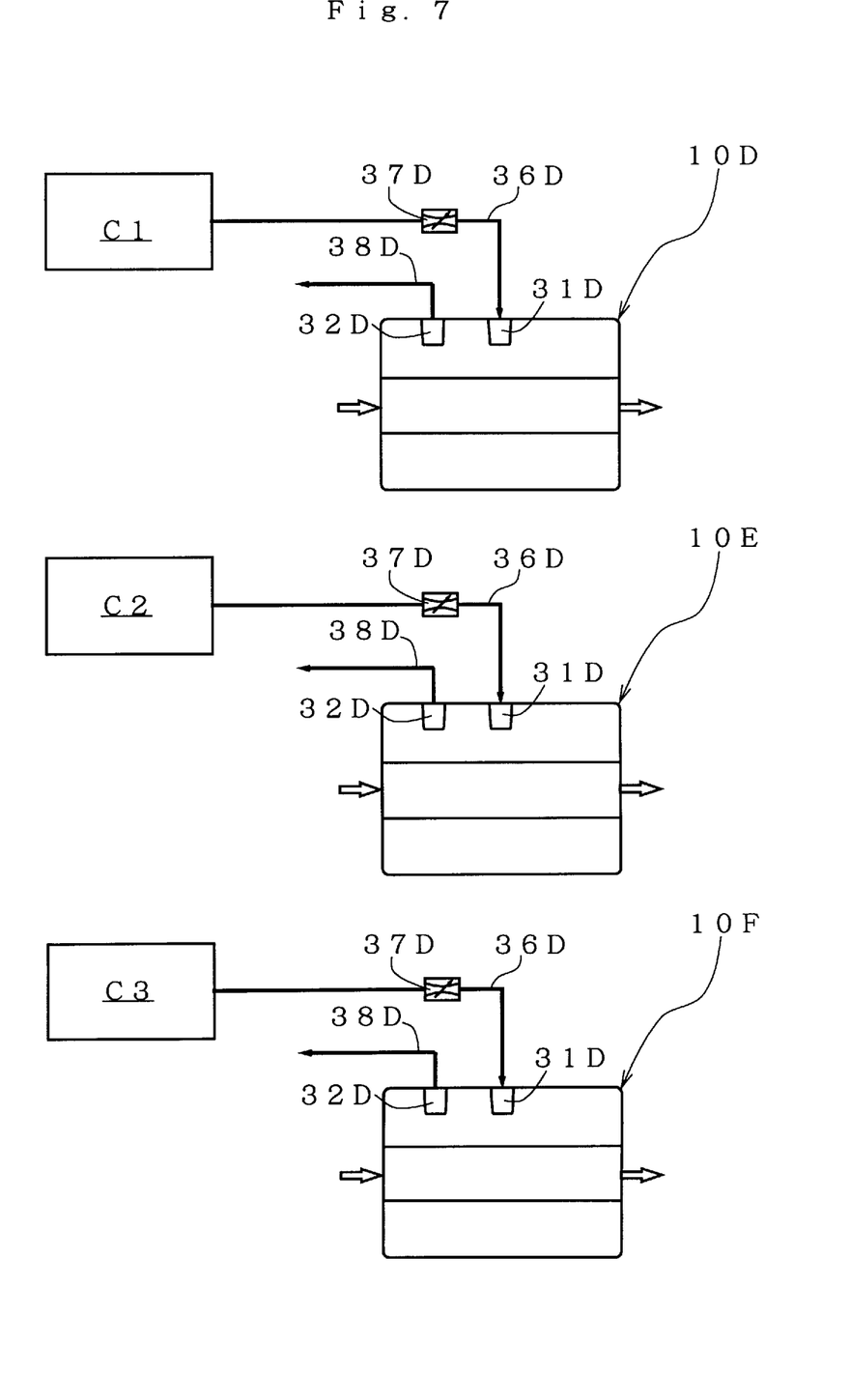
FIG. 7 shows a comparison example for the arrangement of FIG. 6.

FIG. 7 shows a comparison example to explain the advantage of the throttle mechanism 39. Flow control valves 10D, 10E, and 10F have each no throttle mechanism in a discharge circuit 38D for discharging pressurized gas from the second pressure chamber 30. The valves 10D to 10F have individual differences in the flow rates and pressures of fluid controlled by the valves. To resolve such differences, the valves must have pressure adjusters C1, C2, and C3 and measuring units (not shown), respectively. In FIG. 7, each valve is provided with an intake port 31D for receiving the pressurized gas, a discharge port 32D for discharging the pressurized gas, a supply circuit 36D for supplying the pressurized gas, and a throttle mechanism 37D arranged in the supply circuit 36D.

Figure 8:
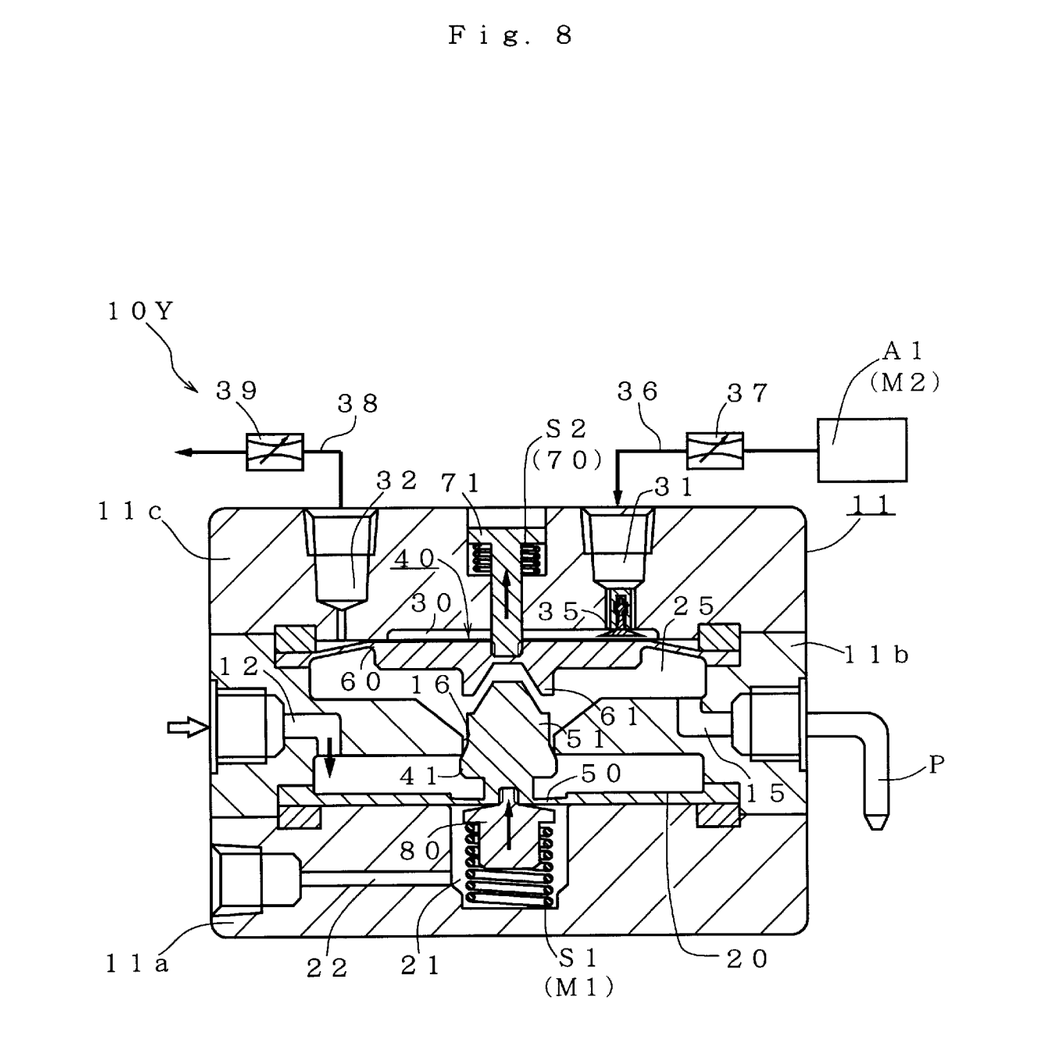
FIG. 8 is a longitudinal section showing a closed state of a flow control valve according to another embodiment of the present invention.

FIG. 8 shows a flow control valve 10Y according to another embodiment of the present invention. The same parts as those of the flow control valve 10 of the preceding embodiment are represented with the same reference marks and the explanation thereof will be omitted.

According to the eighth aspect of the present invention, the valve 10Y has a second diaphragm 60 provided with a suck-back mechanism 70. According to the ninth aspect of the present invention, the suck-back mechanism 70 consists of a spring S2 having a predetermined spring constant. The spring S2 pushes the second diaphragm 60 away from a valve chamber 25 against a second pressurizing unit M2. The spring S2 is supported by a spring receiver 71 that is attached to the second diaphragm 60. The suck-back mechanism 70 is not limited to a spring. It may employ any other driving mechanism.

When pressure generated by the second pressurizing unit M2 is decreased below a predetermined value to close a valve seat 16, the suck-back mechanism 70 works to expand the volume of a space adjacent to an outlet 15 in the valve chamber 25. This drops pressure in the valve 10Y to draw fluid in an outlet pipe P connected to the outlet 15 back into the valve 10Y, thereby preventing the dripping of the fluid.

Figure 9:
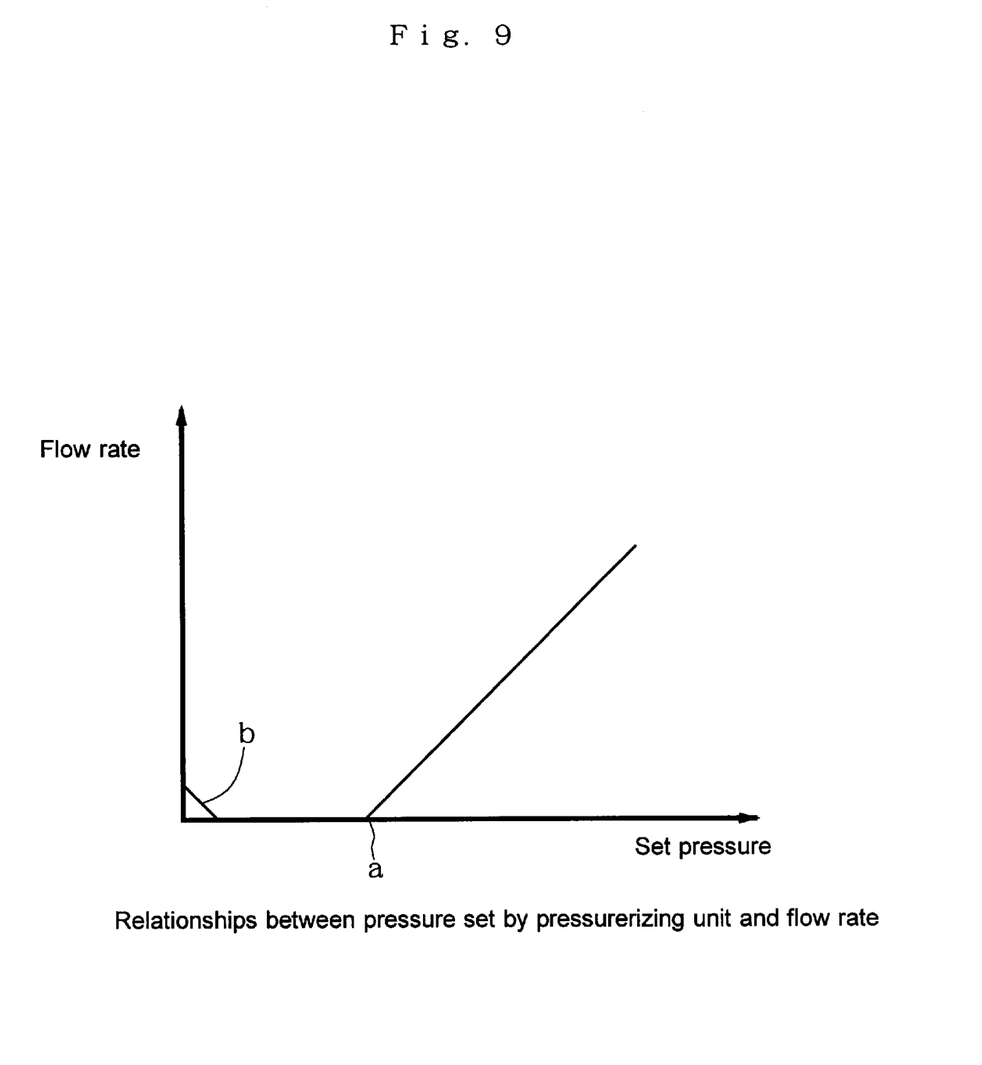
FIG. 9 is a graph showing relationships between the set pressure of a pressurizing unit and the flow rate of fluid controlled by the valve of FIG. 8.

FIG. 9 shows relationships between a set pressure of the second pressurizing unit M2 and the flow rate of fluid controlled by the valve 10Y. When the set pressure of the second pressurizing unit M2 is decreased below "a," the flow rate of the fluid becomes zero. A reference mark "b" in FIG. 9 indicates a scheduled suck-back quantity.

As explained above, the present invention provides a flow control valve that is capable of preventing deterioration, damage, or the production of dust particles against a load increase at the outlet (secondary side) thereof. The valve of the present invention provides improved functions, durability, and flow control reliability. The valve of the present invention is applicable to, in particular, ultrapure water and chemical fluid.

The flow control valve of the present invention is capable of closing the secondary side thereof. This is impossible for conventional flow control valves to achieve. As a result, the valve of the present invention opens new application fields and improves serviceability.

The valve of the present invention employs a diaphragm mechanism that instantaneously responds to momentary or pulsating load changes. The valve of the present invention employs simple and low-cost mechanical and electrical mechanisms to realize simple structure and easy maintenance.

What is claimed is:

1. A valve (10) for controlling the flow rate of fluid, comprising a body (11) and a valve mechanism (40),
the body defining a chamber (20) that involves an inlet (12) for receiving the fluid, a valve seat (16) for passing the fluid, and an outlet (15) for discharging the fluid,
the valve mechanism consisting of a valve plug (41) for opening and closing the valve seat, a first diaphragm (50) arranged in the vicinity of the inlet, and a second diaphragm (60) arranged in the vicinity of the outlet,
each of the diaphragms being in the chamber and having a periphery fixed to the body, the diaphragms dividing the chamber into a first pressure chamber (21) outside the first diaphragm, a valve chamber (25) between the diaphragms, and a second pressure chamber (30) outside the second diaphragm, the valve chamber including the inlet, valve seat, and outlet, the first and second pressure chambers being provided with first pressurizing means (M1) and second pressurizing means (M2), respectively, to always apply constant pressure to the valve chamber through the first and second diaphragms, wherein:
the first diaphragm (50) is provided with an integrated first member (51) having the valve plug (41) and the second diaphragm (60) is provided with an integrated second member (61) that removably engages with the first member.

2. The valve of claim 1, wherein the first and second members have a conical projection (52) and a conical recess (62), respectively, which removably engage with each other.

3. The valve of any one of claims 1 and 2, wherein the pressurizing means provided for the first pressure chamber is a spring (S1).

4. The valve of claim 1 or 2, wherein the pressurizing means provided for the second pressure chamber is pressurized gas (A1).

5. The valve of claim 4, further comprising a check valve (35) arranged at an intake port (31) that introduces the pressurized gas into the second pressure chamber.

6. The valve of claim 5, further comprising a throttle mechanism (37) arranged in a supply circuit (36) that supplies the pressurized gas to the second pressure chamber.

7. The valve of claim 6, further comprising a throttle mechanism (39) arranged in a discharge circuit (38) that discharges the pressurized gas from the second pressure chamber.

8. The valve of claim 7, further comprising a suck-back mechanism (70) working on the second diaphragm.

9. The valve of claim 8, wherein the suck-back mechanism has a spring (S2) to push the second diaphragm away from the valve chamber.

* * * * *